US008689226B2

(12) United States Patent
Cipar et al.

(10) Patent No.: US 8,689,226 B2
(45) Date of Patent: Apr. 1, 2014

(54) ASSIGNING RESOURCES TO PROCESSING STAGES OF A PROCESSING SUBSYSTEM

(75) Inventors: James Adam Cipar, Pittsburgh, PA (US); Craig A. Soules, San Francisco, CA (US); Kimberly Keeton, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 362 days.

(21) Appl. No.: 13/105,294

(22) Filed: May 11, 2011

(65) Prior Publication Data
US 2012/0291041 A1 Nov. 15, 2012

(51) Int. Cl.
*G06F 9/46* (2006.01)

(52) U.S. Cl.
USPC .......................................................... 718/104

(58) Field of Classification Search
None
See application file for complete search history.

(56) References Cited

U.S. PATENT DOCUMENTS

| | | | |
|---|---|---|---|
| 6,179,489 B1 * | 1/2001 | So et al. ...................... | 718/102 |
| 7,103,590 B1 | 9/2006 | Murthy | |
| 7,472,113 B1 | 12/2008 | Watson | |
| 7,659,899 B2 * | 2/2010 | Paltashev et al. ............. | 345/505 |
| 7,676,539 B2 * | 3/2010 | Jhoney et al. ................. | 709/202 |
| 8,144,149 B2 * | 3/2012 | Jiao et al. ..................... | 345/426 |
| 8,225,319 B2 * | 7/2012 | Laithwaite et al. ........... | 718/102 |
| 2004/0260685 A1 | 12/2004 | Pfleiger | |
| 2007/0038658 A1 | 2/2007 | Ghosh | |
| 2007/0091089 A1 * | 4/2007 | Jiao et al. ..................... | 345/426 |
| 2007/0143759 A1 * | 6/2007 | Ozgur et al. .................. | 718/102 |
| 2009/0070313 A1 | 3/2009 | Beyer | |
| 2009/0199192 A1 * | 8/2009 | Laithwaite et al. ........... | 718/104 |

OTHER PUBLICATIONS

Kimberly Keeton et al., International Application No. PCT/US10/41307 filed Jul. 8, 2010 entitled Resource Assignment for Jobs in a System Having a Processing Pipeline (37 pages).
Craig A.N. Soules et al., U.S. Appl. No. 12/703,858, filed Feb. 11, 2010 entitled Storing Update Data Using a Processing Pipeline (44 pages).
Spiliopoulou et al., Modelling Resource Utilization in Pipelined Query Execution, 1996 (9 pages).
Harizopoulos et al., QPipe: A Simultaneously Pipelined Relational Query Engine, SIGMOD 2005,(12 pages).
Arpaci-Dusseau, University of Wisconsin, Madison, ACM Transactions on Computer Systems, vol. 21, No. 1, Feb. 2003, Run-Time Adaptation in River (51 pages).
Moffat et al., Abstract, A Pipelined Architecture for Distributed Text Query Evaluation, vol. 10, No. 3, Oct. 2006 (2 pages).

* cited by examiner

*Primary Examiner* — Van Nguyen

(57) ABSTRACT

A processing subsystem has plural processing stages, where output of one of the plural processing stages is provided to another of the processing stages. Resources are dynamically assigned to the plural processing stages.

23 Claims, 4 Drawing Sheets

ASSIGNING RESOURCES TO PROCESSING STAGES OF A PROCESSING SUBSYSTEM

BACKGROUND

A system can have multiple processing stages for performing respective processing tasks. After one processing stage has completed its respective processing task, the processing stage can send processed data to another processing stage for further operations. If the processing stages are not properly configured, overall system performance may suffer.

BRIEF DESCRIPTION OF THE DRAWINGS

Some embodiments are described with respect to the following figures.

DETAILED DESCRIPTION

Multiple processing stages of a processing subsystem can be used to perform respective different tasks, such as tasks relating to processing of data. In some examples, input data can be submitted to a first processing stage of the processing subsystem. After the first processing stage has applied respective processing to the received data, the processed data can then be sent to subsequent processing stage(s) for further processing. The processing subsystem can have two or more processing stages.

Workload of a processing subsystem can be dynamically changing. A "workload" generally refers to a collection of tasks that are to be performed as a group. As workload changes, some of the processing stages can experience heavier loading than other processing stages. Thus, it may be possible that at least one particular one of the processing stages may become a bottleneck for the overall flow of data processing. For example, the particular processing stage may experience a sudden spike of increased work, which can cause the particular processing stage to slow down. As a result, downstream processing stages may experience delays in receiving processed data from the particular processing stage. As other processing stages are forced to wait for the particular processing stage to finish its work, overall performance of the processing subsystem can suffer. Also, as tasks are completed and data passed to downstream processing stages, different ones of the processing stages may become bottlenecks at different times.

Figure 1:
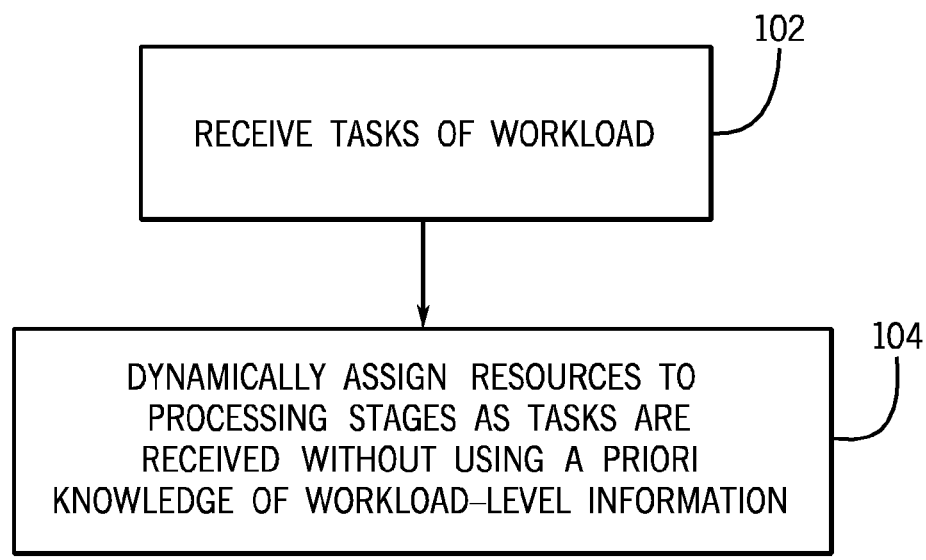
FIG. 1 is a flow diagram of a process of dynamic assignment of resources, according to some implementations.

In accordance with some implementations, mechanisms or techniques are provided to dynamically allocate physical resources to different processing stages of a processing subsystem, so that the likelihood of processing stages becoming bottlenecks is decreased, even in the presence of dynamic workloads. FIG. 1 depicts a general flow diagram of a process according to some implementations. Tasks of a workload to be executed in the processing subsystem are received (at 102). A task is received if data to be processed arrives at the processing subsystem, or if a request specifying a task to be performed is received at the processing subsystem.

As the tasks are received, resources are dynamically assigned (at 104) to the multiple processing stages of the processing subsystem to perform respective tasks. The dynamic assignment of the resources can be performed without using a priori knowledge of workload-level information of the workload—in other words, dynamic assignment of resources can be performed without knowing beforehand any workload-level information of the workload. Workload-level information refers generally to information describing an overall workload that has multiple tasks. For example, such information can include quantitative information about what workload demands will be and how they will vary over time. The quantitative information can specify that, for a given workload, data is expected to be input to the processing subsystem at an average rate of X rows per second for a period of m hours, followed by a surge of data at a rate of Y(Y>X) rows per second for n hours, followed by a reduced data rate of X rows per second for m hours, and then followed by a further reduced rate of data of Z (Z<X) rows per second for p hours. The foregoing pattern can repeat every given time interval, such as every day, every week, and so forth. Given the foregoing workload-level information, and given models for each of the processing stages, an estimate can be provided about how much load each processing stage would experience over time.

There are other examples of workload-level information.

In accordance with some implementations, it is assumed that workload-level information such as that noted above is not available (or not known beforehand) for performing dynamic assignment of resources to processing stages of a processing subsystem. Instead, the dynamic assignment of resources is performed on a task-by-task basis as the tasks of the workload are received, without using any a priori workload-level information. This allows for the dynamic assignment of resources to be performed on-the-fly as such tasks are received for processing by the processing subsystem. Dynamic assignment of resources "on-the-fly" refers to assignment of resources to the processing stages as tasks of a workload are continually received (due to data or requests arriving at respective processing stages), rather than assignment of resources to the processing stages once the entire workload is known and workload-level information of the workload becomes available.

The dynamic assignment of resources performed at 104 also considers at least one property associated with the resources to determine which resources to assign to perform respective tasks. Basically, the dynamic assignment considers which resources are "better" (in terms of increased performance, lower cost, etc.) for performing respective different tasks. The at least one property that is considered by the dynamic assignment can include one or some combination of the following properties: (1) data locality (a resource locally storing data to be processed by a given task may provide better performance than another resource that does not locally store the data); (2) resource bandwidth (a resource having a higher bandwidth, e.g., input/output bandwidth, processing bandwidth, communication bandwidth, etc., may provide better performance); (3) memory capacity (a resource having a larger memory capacity may provide better performance; and (4) any other predefined factor that provides an indication that processing the given task at the resource may result in better performance, reduced cost, and so forth.

In some implementations, the processing subsystem can be a processing pipeline that has multiple processing stages to apply different types of processing with respect to incoming data. In some examples, the incoming data can be data updates for updating data stored in a system. The processing stages of the processing pipeline can be configured to perform corresponding processing, such as data ingestion, identifier (ID) remapping, data sorting, and data merging. The processing pipeline can include an ingest stage, an ID remapping stage, a sorting stage, and a merging stage, for performing the foregoing respective tasks.

Data updates from various update sources are provided to the processing pipeline. Examples of the update sources include various machines, such as desktop computers, notebook computers, personal digital assistants (PDAs), servers (e.g., file servers, email servers, etc.), or other types of devices. Other examples of update sources include sources of stock market transactions, web logs, cluster logs, e-commerce history, and so forth.

The ingest stage of the processing pipeline batches (collects) incoming updates from update sources into one or plural unsorted data structures. The unsorted data structure(s) are provided to the ID remapping stage, which transforms initial (temporary) ID(s) of the data structure(s) into global ID(s). Effectively, the ID remapping stage maps an ID in a first space to an ID in a second space, which in some implementations is a global space to provide a single, searchable ID space.

The output of the ID remapping stage includes one or plural remapped data structures (within any remapped data structure, an initial ID has been remapped to a global ID). The remapped data structure(s) is (are) provided to the sorting stage, which sorts data in the remapped data structure(s) by one or plural keys to create sorted data structure(s).

The sorted data structure(s) output by the sorting stage is (are) provided to the merging stage. The merging stage combines individual sorted data structure(s) into a single set of authority tables to be stored by the processing pipeline.

In alternative implementations, the processing subsystem can be a subsystem according to a MapReduce framework. A MapReduce framework provides a distributed computing platform that includes multiple processing stages to perform respective map tasks and reduce tasks. The map tasks are defined by a map function, while the reduce tasks are defined by a reduce function. Each of the map and reduce functions are user-defined functions or other types of functions that are programmable to perform target functionalities. A map function processes corresponding segments of input data to produce intermediate results, where each of the multiple map tasks (that are based on the map function) processes corresponding segments of the input data. For example, the map tasks process input key-value pairs to generate a set of intermediate key-value pairs. The reduce tasks (based on the reduce function) produce an output from the intermediate results. For example, the reduce tasks can merge the intermediate values associated with the same intermediate key.

More specifically, in some examples, the map function takes input key-value pairs ($k_1$, $v_1$) and produces a list of intermediate key-value pairs ($k_2$, $v_2$). The intermediate values associated with the same key $k_2$ are grouped together and then passed to the reduce function. The reduce function takes an intermediate key $k_2$ with a list of values and processes them to form a new list of values ($v_3$), as expressed below.

$$\text{map}(k_1,v_1) \to \text{list}(k_2,v_2)$$

$$\text{reduce}(k_2,\text{list}(v_2)) \to \text{list}(v_3)$$

The multiple map tasks and multiple reduce tasks are designed to be executed in parallel across resources of a distributed computing platform. Generally, the map tasks are performed by a map stage of the distributed computing platform, while the reduce tasks are performed by a reduce stage of the distributed computing platform. The reduce stage has multiple phases, including a shuffle phase, sort phase, and reduce phase. In the shuffle phase, the reduce tasks fetch the intermediate data from the map tasks. In the sort phase, the intermediate data from the map tasks are sorted. Finally, in the reduce phase, the sorted intermediate data (in the form of a key and all its corresponding values, for example) is passed to the reduce function to perform the functionality defined by the reduce function.

In other examples, other types of processing subsystems having multiple processing stages can be used.

Figure 2:
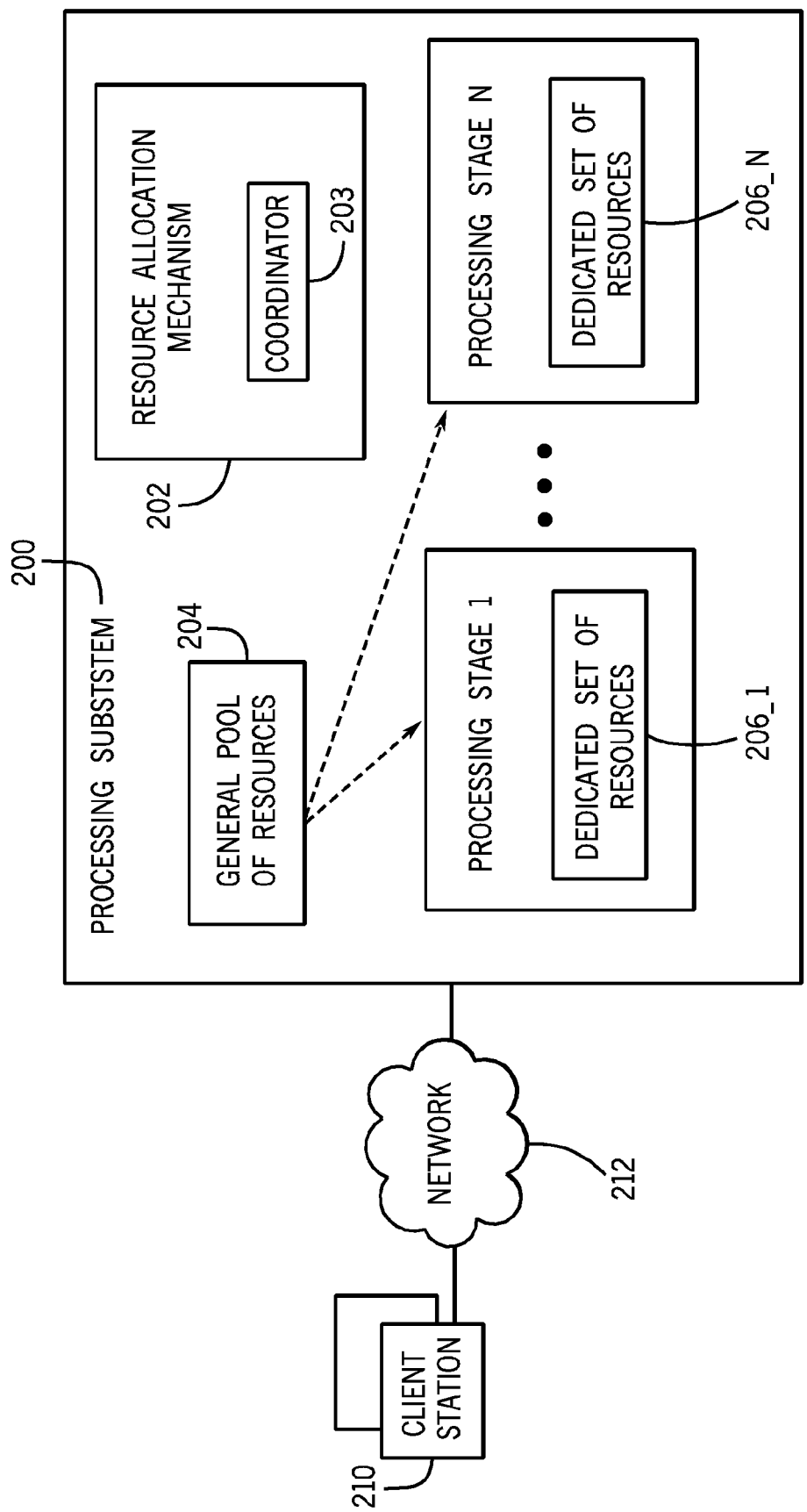
FIG. 2 is a block diagram of a processing subsystem according to some implementations.

FIG. 2 depicts a processing subsystem 200 that has processing stages 1 through N (where N is greater than or equal to 2). Also depicted in FIG. 2 are one or multiple client stations 210 that are coupled to the processing subsystem 200 over a network 212. The client station(s) 210 can submit data (e.g., data updates) and/or requests to the processing subsystem 200 for processing.

In an example operation, input data can be submitted to the first processing stage 1. After processing of the input data, the processing stage 1 provides processed data to the next processing stage, which applies further processing on the data. This flow continues until the processed data reaches the last stage, processing stage N. The final output from the last processing stage N can be written to persistent storage media and/or provided to a requester of the data. In some cases, an intermediate processing stage may create useful output data that can be accessed.

The processing subsystem 200 has a resource allocation mechanism 202 according to some implementations, which includes a coordinator 203 that is able to assign resources to perform respective tasks at the processing stages 1 to N. The coordinator 203 is able to dynamically assign resources from a general pool 204 of resources to the processing stages 1 through N. Dynamic assignment of resources from the general pool 204 to the processing stages refers to the ability to change assignments of the resources from the pool 204 to the processing stages over time. As tasks are received and completed, the coordinator 203 can change assignment of resources of the pool 204 to the processing stages such that processing stages that are experiencing increased work are provided additional resources from the pool 204, while processing stages that have less work are assigned less resources from the pool 204. In this way, the coordinator 203 can reduce the likelihood that any of the processing stages becomes a bottleneck that slows down work at the bottleneck processing stage while downstream processing stages wait for completion of the work to be performed by the bottleneck processing stage.

In some examples, each processing stage 1 through N can be associated with a respective dedicated set of resources (206_1 through 206_N, respectively). Although each processing stage is shown as being associated with a dedicated set of resources, it is noted that in alternative examples, dedicated sets of resources are not provided for some or all of the processing stages. A dedicated set of resources is a set of resources that are statically assigned to the respective processing stage, where this dedicated set of resources is not intended for use by other processing stages.

The coordinator 203 is also able to assign a resource of a dedicated set 206_i to perform task(s) at a given processing stage i (i selected from 1 to N).

Examples of physical resources in the general pool 204 or in the dedicated sets of resources (206_1 through 206_N) include processing resources (e.g., central processing units or CPUs, server computers, etc.), storage resources (e.g., disk drives, memory, etc.), network resources (e.g., network interface controllers, network routers or switches, etc.), and/or other types of resources.

Generally, for a given processing stage i, a coordinator can first attempt to assign tasks (for performance at the processing stage i) to respective resource(s) from the corresponding dedicated set (206_i, i=1 to N), if resource(s) from the dedicated set is available. However, if resource(s) from the dedicated set 206_i is (are) not available, either because the resource(s) of the dedicated set is (are) being used, or the processing stage is not associated with any dedicated set of resources, then the coordinator 203 can dynamically assign resource(s) from the general pool 204 to the processing stage to process the data. In this way, resources of the general pool 204 can be reassigned (on-the-fly) to different processing stages according to a changing pattern of work.

As noted above, the dynamic assignment of resources, which can be from a dedicated set of resources or from the general pool 204, considers at least one property associated with the resources to determine which resources to assign to respective tasks. This allows the dynamic assignment to consider which resources are "better" (in terms of increased performance, lower cost, etc.) for performing respective different tasks.

In some examples, the configuring of the general pool of resources 204 and the dedicated sets of resources 206_1 to 206_N can be performed by a system administrator who may use expert knowledge in making decisions regarding how the general pool of resources 204 and the dedicated sets of resources are to be configured. Such expert knowledge can be based on the administrator's understanding of expected workloads to be performed by the processing subsystem 200. In some implementations, a hybrid approach can be used, where the general pool of resources 204 is provided, and at least some of the processing stages are associated with dedicated sets of resources. Alternatively, the administrator can simply configure the general pool of resources 204 (without configuring any dedicated sets of resources).

Figure 3:
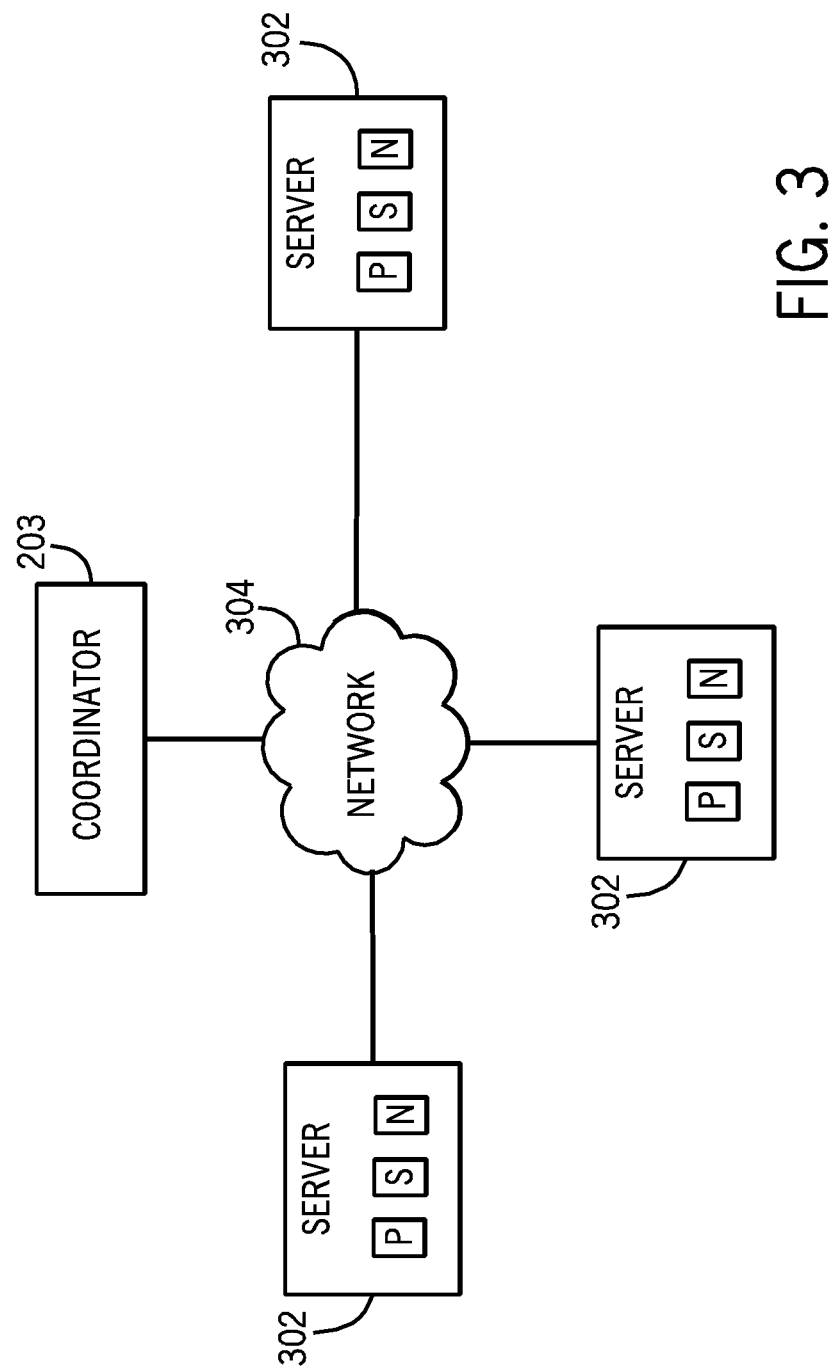
FIG. 3 is a block diagram of an infrastructure having resources assignable to processing stages of a processing subsystem, in accordance with some implementations.

FIG. 3 depicts an infrastructure having resources assignable to corresponding processing stages of the processing subsystem 200, according to some examples. In examples according to FIG. 3, the resources that are assignable to processing stages are servers 302. The servers 302 are connected to each other over a network 304. In this manner, any server 302 can communicate with any other server 302 over the network 304. Thus, each server 302 can receive input from any other server 302, which allows any of the servers 302 to be assigned to any of the processing stages 1 to N in the processing subsystem 200 (FIG. 2). In alternative examples, some of the servers 302 can be dedicated to respective processing stages, while remaining servers are part of the general pool 204 that can be dynamically assigned to any of the processing stages.

Thus, in some examples, the general pool of resources 204 (FIG. 2) can include a first subset of the servers 302 depicted in FIG. 3, while the dedicated sets of resources 206_1 to 206_N can include respective other subsets of the servers 302. Each server 302 includes a processing resource ("P"), a storage resource ("S"), and a network resource ("N").

As depicted in FIG. 3, the coordinator 203 is able to communicate over the network 304 with the servers 302. In this way, the coordinator 203 can perform assignment of the servers 302 to perform respective tasks.

In different implementations, rather than assigning entire servers 302 to respective processing stages, the servers 302 can be partitioned into smaller segments. Thus, for example, each server 302 can be partitioned into multiple resource segments, with such resource segments being assignable (either dynamically or statically) to respective ones of the processing stages.

Figure 4:
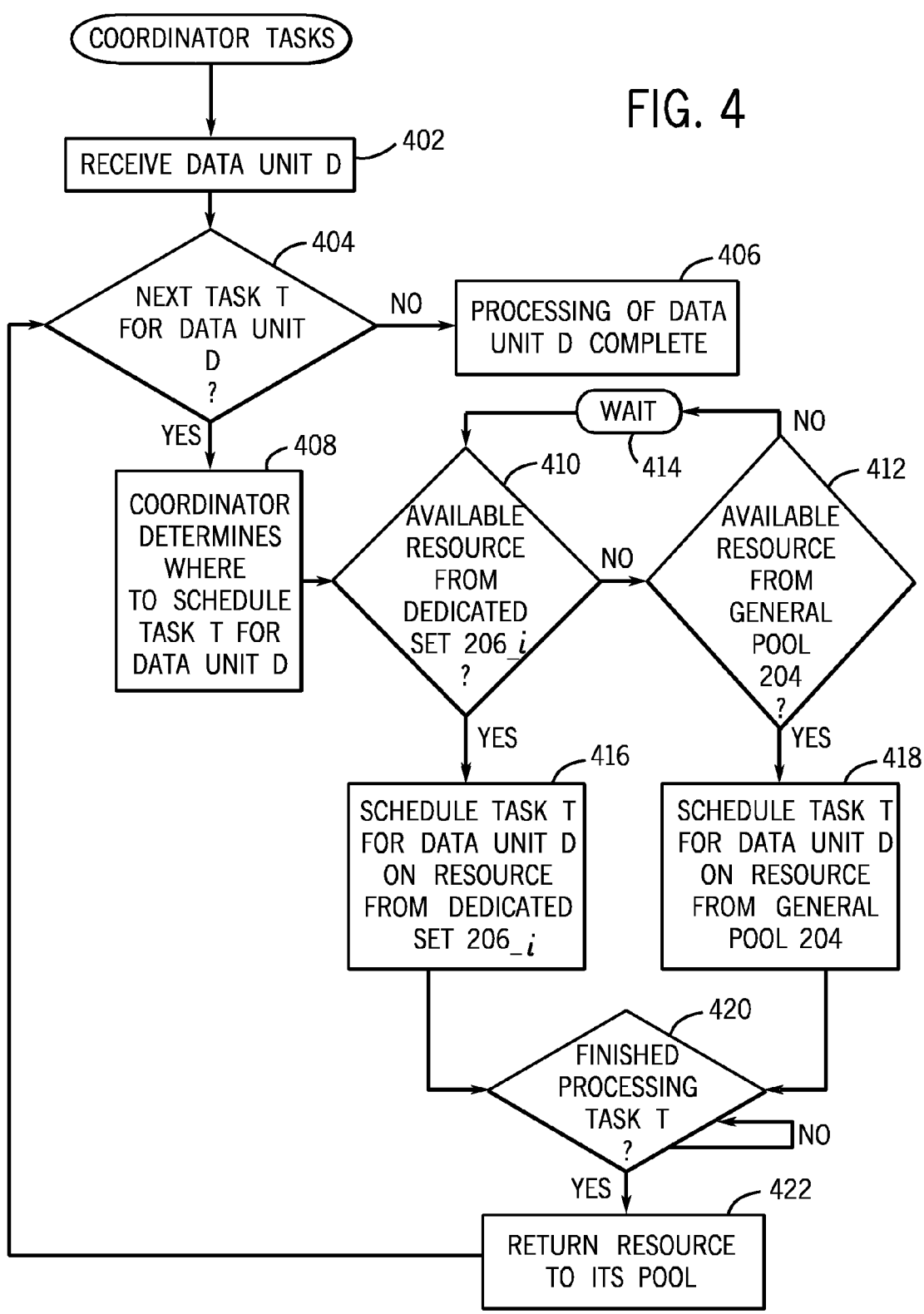
FIG. 4 is a flow diagram of a process of a coordinator according to some implementations.

FIG. 4 is a flow diagram of a process of the coordinator 203, according to some implementations. The coordinator 203 receives (at 402) a data unit D for processing. Although FIG. 4 shows processing of a data unit D, note that the system can process multiple data units concurrently using the flow according to FIG. 4. The coordinator 203 determines (at 404) a next task T to perform for the data unit D. The next task T can be a task performed by a particular one of the processing stages. When a current task completes, the coordinator 203 is notified of such completion. Using such notifications, the coordinator 203 is able to track all units of data being processed by tasks in the various processing stages 1 to N, including what stage(s) a particular unit of data has been processed by and on which server (or other resource) the particular unit of data resides.

If the coordinator 203 determines (at 404) that no further tasks are to be performed for the data unit D, then the processing of data unit D is considered to be complete (at 406). However, if the coordinator 203 determines (at 404) that there is a next task T to perform for the data unit D, the coordinator determines (at 408) where (what server or other resource) to schedule the task T for data unit D.

The coordinator 203 first determines (at 410) whether an available server (or other resource) exists in the corresponding dedicated set of resources 206_i (i=1 to N) (FIG. 2). If not, then the coordinator 203 determines (at 412) whether an available sever (or other resource) exists in the general pool 204 of resources. If an available server (or other resource) is also not present in the general pool 204 of resources, then processing waits (at 414) until a server (or other resource) becomes available in either the dedicated set 206_i or general pool 204.

The coordinator 203 can follow any of a number of resource allocation constraints when assigning resources to perform tasks in the respective processing stages. One example resource allocation constraint specifies that no server (or other resource) can be working on more than one task at one time. Alternatively, other resource allocation constraints can specify that multiple tasks can be assigned to each server (or other resource). In this latter case, the coordinator 203 is configured to know how much work is being done by each server (or other resource) to avoid oversubscribing the server (or other resource) and causing problems such as memory thrashing or other overloading issues. Once a server (or other resource) is performing as much work as the policy allows, the server (or other resource) is moved from the respective idle list to the respective working list. A resource is considered to be available (is part of an idle list) if the work assigned to the resource does not exceed a predefined threshold.

If the coordinator 203 determines (at 410) that an available server (or other resource) is present in the corresponding dedicated set 206_i, then the coordinator 203 schedules (at 416) the task T for data unit D on the available server (or other resource) from the corresponding dedicated set 206_i. On the other hand, if the coordinator 203 determines (at 412) that an available server (or other resource) is present in the general pool 204 (but not in the corresponding dedicated set 206_i), then the coordinator 203 schedules (at 418) the task T for data unit D on the available resource from the general pool 204.

Next, the coordinator 203 determines (at 420) if the processing of task T is complete. Once the processing of task T is completed by the assigned server (or other resource), such server (or other resource) can be returned (at 422) by the coordinator 203 to the general pool 204 or respective dedicated set of resources 206_*i*. For example, if the server (or other resource) was assigned from the general pool 204, then the server (or other resource) would be returned to the general pool 204. On the other hand, if the server (or other resource) was assigned from a dedicated set 206_*i*, then the server (or other resource) would be returned to the dedicated set 206_*i*. Returning a resource to the general pool 204 or dedicated set 206_*i* refers to providing an indication that such resource of the general pool 204 or dedicated set 206_*i* is available to be assigned additional work.

The process of FIG. 4 then returns to determine (at 404) whether a further task T is to be performed on data unit D.

Figure 5:
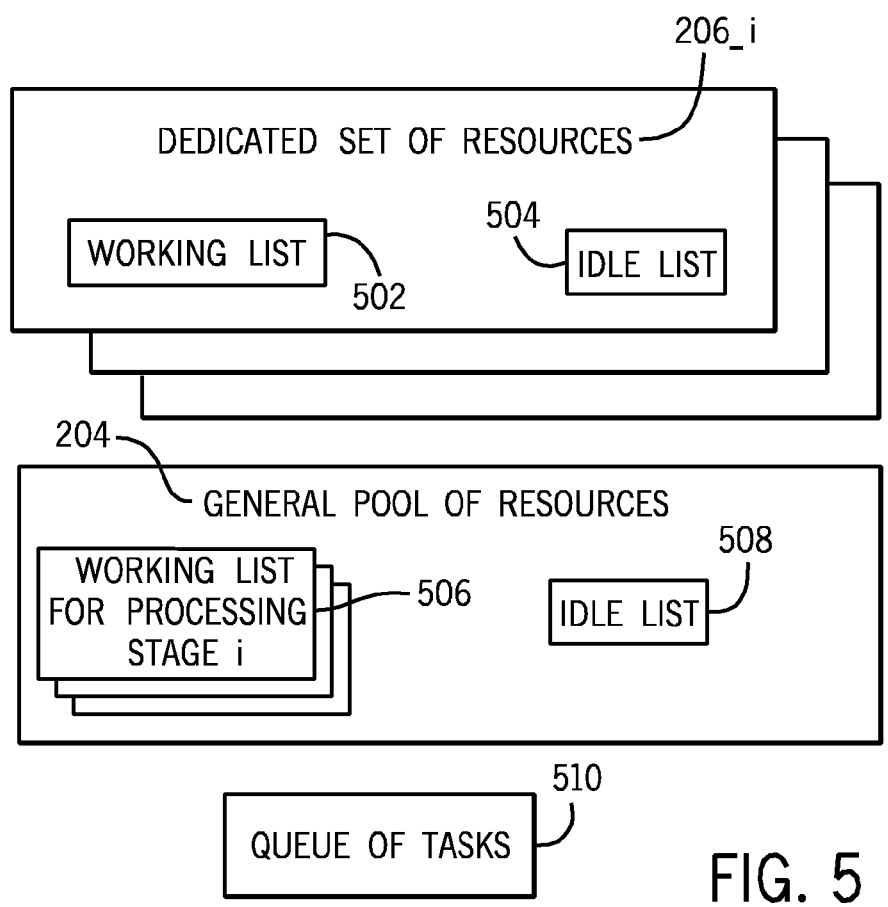
FIG. 5 is a schematic diagram of data structures usable by a coordinator according to some implementations.

In some examples, the determination (410, 412) of whether a server (or other resource) is available in a dedicated set 206_*i* or the general pool 204 can be based on using lists associated with the dedicated sets of resources (206_1 to 206_N) and the general pool of resources 204. As shown in FIG. 5, two lists are maintained with respect to each dedicated set of resources 206_*i* (i selected from 1 to N) for each respective processing stage i, including a working list 502 and an idle list 504. The working list 502 (referred to as a "stage-specific working list") includes the list of resources of the dedicated set 206_*i* that are currently assigned to perform tasks in the processing stage i. The idle list 504 (referred to as a "stage-specific idle list") includes a list of available resources from the dedicated set 206_*i* that can be assigned work for processing stage i.

The general pool of resources 204 is also associated with working lists 506 and an idle list 508. There are N working lists 506 (referred to as "general pool working lists") for the respective N processing stages. Each general pool working list 506 identifies the resources of the general pool 204 that have been assigned to perform work in a respective processing stage. The idle list 508 (referred to as a "general pool idle list") identifies resources of the general pool 204 that are available to be assigned to any of the processing stages to perform work.

In a specific example, for a processing subsystem having three processing stages, there can be ten lists: three stage-specific working lists 502, three stage-specific idle lists 504, one general pool idle list 508, and three general pool working lists 506 (for the respective three processing stages).

Although reference is made to lists, it is noted that other data structures can be used to maintain information regarding working and idle resources in other implementations. More generally, subsets of working resources and idle resources are identifiable using such data structures.

As further shown in FIG. 5, a queue 510 of tasks that are waiting to be processed by the processing subsystem 200. Although just one queue 510 is shown in FIG. 5, it is noted that there can be multiple queues 510, one for each processing stage. When a unit of data has reached a particular processing stage (processing stage i), the coordinator 203 determines if there is an idle resource available to execute the respective task for the unit of data (where this task is provided in the queue 510). The coordinator 203 first determines if there is an idle resource available from the respective stage-specific idle list 504 for the particular processing stage i. If so, the coordinator 203 assigns work to perform the respective task to the idle resource from the stage-specific idle list 504.

If a stage-specific resource is not available (as determined from the stage-specific idle list 504 of the processing stage i), the coordinator 203 attempts to assign a resource from the general pool idle list 508. There are various ways to choose a resource from the general pool idle list 508. The simplest way is to take the first resource from the general pool idle list 508 and move it to the respective general pool working list 506 (for the processing stage i). Alternative strategies can be used in other examples.

If the coordinator 203 is unable to find an available idle resource (from either the stage-specific idle list 504 or the general pool idle list 508) to assign a given task, the coordinator 203 waits until an appropriate resource becomes available (while the given task remains in the queue 510). This can be detected by the coordinator 203 monitoring the idle lists 504 and 508 until a resource becomes available, at which time the coordinator 203 moves the idle resource from the idle list 504 or 508 to the respective working list 502 or 506 for assignment to perform the given task. When a particular resource completes its assigned work, the particular resource notifies the coordinator 203. The coordinator 203 determines whether the particular resource is a stage-specific resource or a general pool resource. The coordinator 203 returns the particular resource to the appropriate idle list. Thus, for example, a resource can be returned from the stage-specific working list 502 to the stage-specific idle list 504 for the particular processing stage i. Alternatively, a resource can be returned from the general pool working list 506 (for the particular processing stage i) to the general pool idle list 508.

After a resource is returned to the appropriate idle list 504 or 508, the resource is made available for assignment to perform other work.

Generally, in some examples, the processing subsystem 200 (FIG. 2) may assume that units of data are processed by each processing stage in the order they arrive at the first processing stage (processing stage 1 in FIG. 2). Such assumption specifies that there is a strict ordering of units of data, and every processing stage is to process the units of data in that order. Following a strict ordering in processing units of data provides for consistency, which allows the system to assume that when a particular unit of data has been processed by a particular processing stage, it is safe to assume that all previous units of data have also been processed by the particular processing stage.

Alternatively, weaker constraints on ordering can be provided. For example, partial ordering over the units of data may specify that units of data uploaded by a single client are processed in order, but there are no ordering constraints between clients (such as client stations 210 shown in FIG. 2). This makes sense when there is no meaningful ordering of units of data from different clients running in parallel. More generally, ordering is specified for units of data within each of multiple groups of units of data (e.g., a first group corresponding to a first client, a second group corresponding to a second client, and so forth). However, no ordering constraint exists among the groups.

Alternatively, the system may have no ordering constraints, which corresponds to an eventual consistency model, where in the absence of updates the processing subsystem 200 eventually reaches a consistent state, but at any given time updates may be applied out of order.

In dynamically assigning resources from the general pool 204 to the processing stages, the coordinator 203 can use any one of various policies. One policy can specify that throughput through the entire processing subsystem 200 is to be maximized (or enhanced) such that overall efficiency is maximized (or enhanced). However, it is conceivable that some intermediate processing stage may produce output that is useful by itself, even when the units of data have not been processed by the entire processing subsystem 200 yet. In such cases, it may be desirable to process data through those processing stages that produce useful outputs as fast as possible, while it may be less important to get the data through the rest of the processing subsystem quickly. In such implementations, when processing stages are competing for resources, the coordinator 203 can prioritize assigning resources to earlier processing stages to ensure that data gets to the relatively important intermediate stages more quickly. Also, it may be desirable to preempt lower priority tasks to allow higher priority tasks to use resources. This can involve simply pausing a lower priority task in memory, suspending the lower priority task to persistent storage media, or killing the lower priority task altogether and restarting the task later.

Another policy can allow certain higher-priority units of data to be rushed through the processing subsystem. With such a policy, when faced with a choice of what task to assign resources to, the coordinator 203 can prioritize processing of the higher-priority units of data. In systems with ordering constraints, this policy can also prioritize processing of units of data that the higher-priority units of data depend on.

If servers in the processing subsystem 200 are configured with local-only storage (storage available by a respective server), rather than a shared storage accessible by multiple servers, that means that reading units of data from another server's output involves communication over the network 204 (FIG. 2). If the network 204 is a highly-contended resource, it is desirable to avoid communication between servers if possible. To achieve this goal, the coordinator 203 can choose which server is to process a task based on data locality. In other words, the server assigned to a task is one where the least network communication is involved (ideally none) to read data that is to be used for the task. A similar optimization would be to choose servers based on a desired location for the processing stage's output data. For instance, if the output of a processing stage is going to be queried by other processes, it may be desirable to distribute that output so that the query load is also distributed. This can be achieved by scheduling tasks for the processing stage to run on servers that are currently storing little of the stage's output.

By using mechanisms or techniques according to some implementations, the efficiency of multi-stage processing subsystems can be improved, while reducing the burden on administrators to configure resources for the various stages of the processing subsystems. Mechanisms or techniques according to some implementations can automatically improve assignment of resources to the multiple stages, without having to use a priori knowledge of workload-level information. The automatic assignment of resources to different stages can be configured to achieve various different policies of a system.

Machine-readable instructions of various modules (such as the coordinator 203 of FIG. 2) are loaded for execution on a processor or multiple processors. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   receiving, by a system having a processor, tasks of a workload to be executed in a processing subsystem having plural processing stages, wherein output of one of the plural processing stages is provided to another of the processing stages; and
   as the tasks are received, dynamically assigning resources to the plural processing stages to perform the tasks, wherein dynamically assigning the resources is performed without using a priori knowledge of workload-level information of the workload, and dynamically assigning the resources considers at least one property associated with the resources to determine which resources to assign to perform respective tasks, wherein the at least one property includes data locality of the resources, and wherein the data locality of a given one of the resources indicates whether data for a respective one of the tasks is locally stored by the given resource.

2. The method of claim 1, wherein dynamically assigning the resources comprises dynamically assigning resources selected from the group consisting of processing resources, storage resources, and network resources.

3. The method of claim 1, wherein dynamically assigning the resources comprises dynamically assigning the resources from a pool, wherein the pool has resources assignable to any of the plural processing stages.

4. The method of claim 3, further comprising:
   after assigning a particular one of the resources from the pool to a particular one of the plural processing stages, performing at least one of the tasks using the particular resource in the particular processing stage; and
   after performing the at least one task, returning the particular resource to the pool to make the particular resource available to another processing stage.

5. The method of claim 3, wherein a particular one of the processing stages is associated with a dedicated set of resources statically assigned to the particular processing stage, the dedicated set of resources not assignable to another of the processing stages, the method further comprising:
   if a resource from the dedicated set is available, using the resource from the dedicated set to process at least one of the tasks at the particular processing stage; and
   if no resource of the dedicated set is available, using a resource dynamically assigned to the particular processing stage from the pool to process the at least one task.

6. The method of claim 1, wherein dynamically assigning the resources is performed by a coordinator, the method further comprising:
- receiving, by the coordinator, information relating to completion of a task relating to a given unit of data from a particular one of the processing stages; and
- in response to the received information, the coordinator assigning another task to another one of the processing stages to further process the given unit of data.

7. The method of claim 1, further comprising:
tracking work assigned to the resources; and
assigning corresponding ones of the tasks to the resources based on the tracked work.

8. The method of claim 1, wherein the at least one property further includes resource bandwidth and memory capacity of each of the resources.

9. The method of claim 1, wherein the workload-level information includes information relating to demands of the workload that vary over time.

10. The method of claim 1, wherein dynamically assigning the resources is according to a policy that assigns different priorities to respective units of data to be processed by the processing stages.

11. A system comprising:
- a processing subsystem having plural processing stages, wherein output of one of the plural processing stages is provided to another of the processing stages;
- a pool of resources dynamically assignable to the plural processing stages; and
- a coordinator including at least one processor to:
  - for performing tasks by the plural processing stages, dynamically assign selected ones of the resources from the pool to the respective processing stages, wherein the dynamic assignment of the resources considers at least one property associated with the resources to determine which resources to assign to perform respective tasks, wherein the at least one property includes data locality of the resources, and wherein the data locality of a given one of the resources indicates whether data for a respective one of the tasks is locally stored by the given resource; and
  - return corresponding ones of the resources to the pool as the respective processing stages complete corresponding tasks.

12. The system of claim 11, wherein at least a particular one of the processing stages has a dedicated set of resources statically assigned to the particular processing stage, the dedicated set of resources not assignable to another of the processing stages,
- wherein the coordinator is to assign a resource from the dedicated set if the resource from the dedicated set is available to perform a task by the particular processing stage, and
- wherein the coordinator is to dynamically assign a resource from the pool to the particular processing stage to perform the task if no resource from the dedicated set is available.

13. The system of claim 12, wherein the dedicated set of resources includes a working subset of dedicated resources assigned to perform work, and an idle subset of dedicated resources that are available to be assigned work, and
- wherein the pool of resources includes a working subset of resources assigned to at least one of the plural processing stages to perform work, and an idle subset of resources assignable to any of the plural processing stages to perform work.

14. The system of claim 11, wherein the plural processing stages include stages of a processing pipeline configured to receive data updates and to update stored data based on the data updates.

15. The system of claim 11, wherein the plural processing stages include stages to perform map tasks and reduce tasks in a MapReduce environment.

16. The system of claim 11, wherein the coordinator is to apply a predefined ordering in performing the tasks, wherein the predefined ordering is one of:
(1) a strict ordering that specifies that units of data are to be processed by the processing subsystem in an order in which the units of data are received by the processing subsystem, and
(2) a partial ordering that specifies that ordering is to be applied within each of multiple groups of units of data, while no ordering constraint exists among the groups.

17. The system of claim 11, wherein the coordinator is to:
track work performed by each of the resources; and
indicate a particular one of the resources as available if the work assigned to the particular resource does not exceed a predefined threshold.

18. The system of claim 11, wherein the coordinator is to dynamically assign selected ones of the resources to the processing stages according to a predefined policy
that prioritizes processing of at least one selected unit of data over other units of data.

19. The system of claim 11, wherein the coordinator is to dynamically assign selected ones of the resources based on a policy that reduces usage of a network.

20. An article comprising at least one non-transitory machine-readable storage medium storing instructions that upon execution cause a system having a processor to:
- receive tasks of a workload to be executed in a processing subsystem having a plurality of processing stages that apply respective different operations, wherein output of one of the plural processing stages is provided to another of the processing stages;
- assign tasks to dedicated resources of the processing stages if the dedicated resources are available, wherein the dedicated resources of a particular one of the processing stages are statically assigned to the particular processing stage and are not assignable to another of the processing stages; and
- if a dedicated resource is unavailable for the particular processing stage, dynamically assign a resource from a general pool of resources to the particular processing stage, wherein the general pool of resources is assignable to any of the processing stages.

21. The article of claim 20, wherein the instructions upon execution cause the system to further:
upon a task being completed by the dynamically-assigned resource at the particular processing stage, return the dynamically-assigned resource to the pool to allow for assignment to another processing stage.

22. The article of claim 20, wherein dynamically assigning the resource from the general pool considers data locality of the resources, wherein the data locality of a given one of the resources indicates whether data for a respective task of the particular processing stage is locally stored by the given resource.

23. The article of claim 22, wherein dynamically assigning the resource from the general pool is according to a policy that assigns different priorities to respective units of data to be processed by the particular processing stage.

* * * * *